United States Patent [19]

Bywater, Jr.

[11] 3,713,463
[45] Jan. 30, 1973

[54] CLOSURE MEMBER FOR PIPES AND THE LIKE

[75] Inventor: James W. Bywater, Jr., Rowland Heights, Calif.

[73] Assignee: Lucille M. Bywater, Pasadena, Calif. part interest to each

[22] Filed: Dec. 24, 1970

[21] Appl. No.: 101,248

[52] U.S. Cl. ...................................................138/89
[51] Int. Cl. ..............................................F16l 55/10
[58] Field of Search....138/89, 89.1, 89.2, 89.3, 89.4; 285/236, DIG. 2; 339/36, 198 M, 198 N; 24/16 R

[56] References Cited

UNITED STATES PATENTS

| | | | |
|---|---|---|---|
| 574,379 | 1/1897 | Bouneu | 285/DIG. 2 |
| 809,903 | 1/1906 | Bowers | 285/236 X |
| 3,043,612 | 7/1962 | Pavlik et al. | 285/236 X |
| 3,126,243 | 3/1964 | Manetti et al. | 239/36 X |
| 3,233,922 | 2/1966 | Evans | 285/236 |
| 3,574,312 | 4/1971 | Miller | 138/89 X |

FOREIGN PATENTS OR APPLICATIONS

| | | | |
|---|---|---|---|
| 211,526 | 11/1957 | Australia | 138/89 |
| 89,329 | 9/1922 | Austria | 138/89.3 |
| 1,475,604 | 10/1969 | Germany | 138/89 |

Primary Examiner—Houston S. Bell, Jr.
Assistant Examiner—Donald B. Massenberg
Attorney—Fred N. Schwend

[57] ABSTRACT

A closure member for pipes, conduits, etc. is disclosed which comprises a cylindrical cap of rubber or other elastomeric material, the cap being closed at one end and having inwardly and circumferentially extending ridges around the inner periphery of its skirt to engage the outer periphery of the pipe. A clamp surrounds the skirt and is adapted to constrict the skirt against the pipe to seal the latter.

2 Claims, 4 Drawing Figures

PATENTED JAN 30 1973

3,713,463

INVENTOR.
JAMES W. BYWATER JR.
BY
Fred N. Schwend 3,713,463

CLOSURE MEMBER FOR PIPES AND THE LIKE

BACKGROUND OF THE INVENTION

1. Field of the Invention

This invention relates to means of sealing one end of a pipe, conduit or the like against fluid pressure.

2. Description of Prior Art

Heretofore, closure members for sealing pipes, etc. generally have comprised an end cap member of a relatively stiff material, such as metal, having internal or external screw threads thereon adapted to be secured to mating screw threads formed at the end of the pipe.

Although such threaded caps are satisfactory, they are relatively expensive, particularly in large diameter sizes, and require the forming of screw threads on the pipe. This may often be inconvenient or undesirable because of the location of the pipe or the use to which it may be put. Often, it may be desirable to only temporarily seal the end of a pipe, as when testing a piping system for leaks. In such cases, it may even be undesirable to thread the end of the pipe to be sealed.

SUMMARY OF THE INVENTION

It becomes the principal object of the present invention to provide an inexpensive closure member for a pipe or the like which may have either a screw threaded or unthreaded end, such closure member being effective to seal such pipe against relatively high fluid pressures.

The invention comprises a cap of rubber or other elastomeric material including a cylindrical skirt closed at one end and adapted to fit over one end of a pipe or the like to be sealed. One or more inwardly extending circumferential ridges on the inner periphery of the skirt is adapted to frictionally engage the outer periphery of the pipe when the cap is mounted. Due to the high unit pressure exerted by the ridges against the outer periphery of the pipe when the clamp means constricts the skirt, the cap is effective to seal the end of the pipe against relatively high fluid pressures. A stiffener member is inserted in the skirt to prevent distension of the end wall of the cap due to fluid pressure.

DETAILED DESCRIPTION OF THE PREFERRED EMBODIMENT

Figure 1:
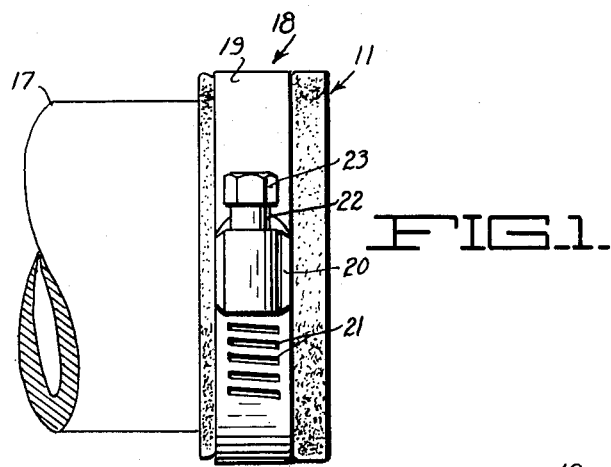
FIG. 1 is a side view of a cap member embodying a preferred form of the present invention and illustrating the same as clamped in sealing condition on the end of a pipe.

Referring to the drawings, the cap member comprises a cap 11 of rubber or other elastomeric material, such as a relatively soft plastic commonly known under the trademark "Neoprene", such material preferably having a hardness on the Shore scale of approximately 60. The cap 11 is formed of a cylindrical skirt 12 which is open at its lefthand end and closed at its opposite end by an integral wall 13 having substantially the same wall thickness as that of the skirt.

Figure 3:
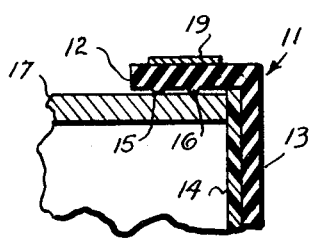
FIG. 3 is a fragmentary sectional view illustrating the cap member fitted over the end of a pipe, prior to being clamped.

A flat stiffener disc 14, preferably of plastic, such as polystyrene, having a considerably greater amount of stiffness than that of the cap, is fitted within the skirt 12 in abutment with the wall 13. Preferably, the diameter of the disc is the same as the inside diameter of the skirt 12 when the latter is in its unclamped position as shown in FIG. 3.

Two inwardly and circumferentially extending ridges 15 and 16 are formed integral with the inner periphery of the skirt 12. Such ridges are preferably semi-circular in cross section and are spaced apart from each other and from the ends of the skirt 12.

The cap 11 is made in different sizes commensurate with the standard sizes of pipe to be sealed. Preferably, the inside diameter of the cap 11 when unconstricted, as shown in FIG. 3, is slightly greater than the outside diameter of the pipe 17 over which it is to be fitted and the inside diameters of the ridges 15 and 16 are of substantially the same diameter as that of the pipe so that they will frictionally engage the same when the cap is initially fitted over the end of the pipe.

Since the stiffener disc 14 is substantially the same diameter as the inner diameter of the skirt 12, the ridge 16 will normally prevent the disc from being separated from the cap when the latter is removed from the pipe.

In order to secure the cap against pipe 17 and to seal the same against fluid leakage, a so-called "hose clamp" 18 is fitted over the skirt 12 in line with the ridges 15 and 16. The clamp 18 is of conventional construction comprising a thin band 19 of metal or the like to which a worm bearing housing 20 is attached at one end. At its opposite end, the band 19 has spaced inclined slots 21 formed therein and engageable by the threads (not shown) of a worm member partly shown at 22, which is rotatably supported within the bearing housing 20. An hexagonal head 23 is formed on the worm member 22 which, when rotated, causes the clamp to constrict the skirt 12, including ridges 15 and 16, against the periphery of the pipe 17.

Due to the relatively small area of the ridges 15 and 16 which initially engage the outer periphery of the pipe 17, a slight clamping action by the clamp causes a relatively high unit pressure to be exerted between such ridges and the pipe to create a fluid tight seal. As the skirt is further constricted by the clamp 18, the entire inner surface of the skirt engages the outer periphery of the pipe, as shown in FIG. 3, to further seal the same against leakage and to prevent the cap from being forced off the end of the pipe by fluid pressure.

Figure 2:
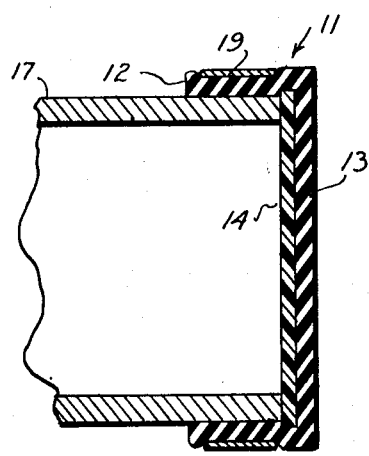
FIG. 2 is a sectional view through the cap member, also illustrating the same as clamped on the end of a pipe.

The stiffener disc 14 prevents undue distension of the end wall 13 upon application of fluid pressure within the pipe. It will be noted in FIG. 2 that the disc 14 is normally slightly greater in diameter than the outside diameter of the pipe 17 so that when skirt 12 is fully constricted it will be somewhat distended in the area directly adjacent the outer periphery of the disc 14, thereby adequately sealing against leakage of fluid around the outer edge of the disc. If desired, the clamp 18 may be located directly over the disc 14.

Figure 4:
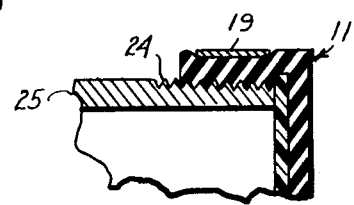
FIG. 4 is a fragmentary view illustrating the cap member clamped in sealing engagement over the end of a screw threaded pipe.

An important feature of the cap member 11 is that it may be equally well used to seal the end of a pipe 25, FIG. 4, which is screw threaded as shown at 24, since the elastomeric material may extrude between the threads when the skirt 12 is constricted and thus form an effective seal against relatively high fluid pressures. Accordingly also, the cap member may be used to effectively seal a pipe having a rough or irregular outer periphery.

A further important feature of the cap member 11 is that it may be repeatedly removed and reused without wear or tendency to leak. In addition, the cap member may be used to effectively seal pipe, conduits, or the like which may, within certain limits, be under or over its nominal diameter.

I claim:

1. A closure member for a pipe, conduit or the like comprising a cap of elastomeric material,
    said cap having a cylindrical skirt and an end wall closing one end of said skirt,
    said skirt having at least one inwardly and circumferentially extending ridge around the inner periphery thereof,
    said ridge being adapted to frictionally engage the outer periphery of a said pipe when fitting said cap over said pipe,
    a substantially rigid disc within said skirt and engageable with said end wall,
    said disc being of a material having greater stiffness than said elastomeric material,
    said disc having a diameter at least substantially equal to the inner diameter of said skirt and greater than the internal diameter of said ridge, and
    clamp means surrounding said skirt over said ridge and adapted to constrict said skirt against said outer periphery of said pipe.

2. A closure member according to claim 1 wherein said clamp means is adapted to sealingly constrict said skirt against the outer periphery of said disc.

* * * * *